US008731600B2

(12) United States Patent
Chang et al.

(10) Patent No.: US 8,731,600 B2
(45) Date of Patent: *May 20, 2014

(54) COORDINATED POWER BOOST AND POWER BACK-OFF

(75) Inventors: Chu-Rui Chang, Plano, TX (US); Jacques Fluet, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 260 days.

This patent is subject to a terminal disclaimer.

(21) Appl. No.: 13/223,907

(22) Filed: Sep. 1, 2011

(65) Prior Publication Data

US 2011/0319126 A1    Dec. 29, 2011

Related U.S. Application Data

(63) Continuation of application No. 12/336,844, filed on Dec. 17, 2008, now Pat. No. 8,023,989.

(60) Provisional application No. 61/188,609, filed on Aug. 11, 2008, provisional application No. 61/188,569, filed on Aug. 11, 2008.

(51) Int. Cl.
   *H04B 7/00*    (2006.01)

(52) U.S. Cl.
   USPC ......................................... 455/522; 455/500

(58) Field of Classification Search
   USPC .......... 455/522, 500, 501, 526; 370/477, 341
   See application file for complete search history.

(56) References Cited

U.S. PATENT DOCUMENTS

| | | |
|---|---|---|
| 2002/0187799 A1 | 12/2002 | Haartsen |
| 2003/0123425 A1 | 7/2003 | Walton et al. |
| 2005/0002422 A1 | 1/2005 | Morihiro et al. |
| 2007/0038886 A1 | 2/2007 | Molkdar et al. |
| 2009/0061778 A1 | 3/2009 | Vrzic et al. |
| 2013/0017857 A1* | 1/2013 | Chang et al. .................. 455/522 |

FOREIGN PATENT DOCUMENTS

| | | |
|---|---|---|
| JP | 2007-124300 | 5/2007 |
| JP | 2008-530918 | 8/2008 |
| JP | 2008-244836 | 10/2008 |
| JP | 2008-300995 | 12/2008 |
| WO | 02/19563 A2 | 3/2002 |
| WO | 2007/099839 | 9/2007 |
| WO | 2008/089183 A1 | 7/2008 |

OTHER PUBLICATIONS

International Search Report and Written Opinion for PCT/IB2009/006474, mailed Jan. 11, 2010.
Office Action issued in Chinese Application No. 200980140603.9 on May 6, 2013; 8 pages.

(Continued)

*Primary Examiner* — Peguy Jean Pierre
(74) *Attorney, Agent, or Firm* — Fish & Richardson P.C.

(57) ABSTRACT

A system and method are provided for boosting power for a communications link between a base station and a user device, or user equipment, over a communications link channel in a cellular communications network. In one embodiment, the base station determines whether a communications link for a user device located within a sector of a cell served by the base station needs a power boost. If a power boost is needed, the base station provides a power boost for the communications link for the user device and, for each of one or more neighboring sectors that neighbor the sector in which the user device is located, coordinates the power boost in both frequency and time with a power backoff for a downlink to another user device located in a cell center area of the neighboring sector.

34 Claims, 8 Drawing Sheets

(56) References Cited

OTHER PUBLICATIONS

International Preliminary Report on Patentability for PCT/IB2009/006474 dated Feb. 15, 2011.

Notice of Allowance issued in Chinese Application No. 200980140603.9 on Dec. 12, 2013; 4 pages.

Office Action issued in Japanese Application No. 2011-522560 on Oct. 31, 2013; 8 pages.

* cited by examiner

COORDINATED POWER BOOST AND POWER BACK-OFF

This application is a Continuation of U.S. patent application Ser. No. 12/336,844, entitled COORDINATED POWER BOOST AND POWER BACK-OFF, filed Dec. 17, 2008, currently pending, which claims the benefit to U.S. Provisional Patent Application Ser. No. 61/188,609, entitled COORDINATED POWER BOOST POWER BACK-OFF, filed Aug. 11, 2008 and U.S. Provisional Patent Application Ser. No. 61/188,569, entitled SUB CHANNELIZATION WITH POWER BOOST, filed Aug. 11, 2008, the disclosures of which are incorporated herein by reference in their entireties.

This application claims the benefit of U.S. provisional patent application Ser. Nos. 61/188,609 and 61/188,569, both of which were filed Aug. 11, 2008 and the disclosures of which are hereby incorporated herein by reference in their entireties.

FIELD OF THE INVENTION

The present invention relates to providing a power boost for a wireless communication link.

BACKGROUND OF THE INVENTION

In all cellular communications networks there are opposing requirements for high spectrum efficiency and high area availability, or coverage. As a Fourth Generation (4G) technology, Long Term Evolution (LTE) is expected to provide high spectrum efficiency. Namely, LTE is expected to provide three to four times higher spectrum efficiency than High-Speed Downlink Packet Access (HSDPA) Release 6 for the downlink, and two to three times higher spectrum efficiency than High-Speed Uplink Packet Access (HSUPA) Release 6 for the uplink. In addition, as with any cellular communications network, LTE must provide 90%-95% coverage, which is referred to as Carrier Grade of Service (CGoS) for coverage. The requirements for high spectrum efficiency and coverage are opposing in that a small frequency reuse factor (N) is desired in order to achieve high spectrum efficiency but, in general, a high frequency reuse factor (N) is desired in order to decrease out-of-cell interference and therefore increase coverage. A maximum spectrum efficiency is achieved when the frequency reuse factor (N) is 1, such that the entire spectrum is reused in each cell of the cellular communications network. However, when the frequency reuse factor (N) is 1, out-of-cell interference is at its maximum and, therefore, coverage is at its worst.

Spectrum efficiency can be roughly determined by a minimum Signal-to-Interference-plus-Noise (SINR) needed for a wireless communication link, or airlink, to survive in the cellular communications network. For example, an Advanced Mobile Phone System (AMPS) typically requires a SINR of greater than or equal to +18 decibels (dB). Thus, in order to achieve the CGoS in AMPS, a very large frequency reuse factor of N=21 is needed in order to achieve the needed SINR. As another example, a Code Division Multiple Access (CDMA) system can operate with SINR values as low as −14 dB as a result of the processing gain due to the spreading and dispreading process. Therefore, a frequency reuse factor of N=1 can be used in the CDMA system.

For LTE, a minimum SINR needed to maintain a wireless communication link is approximately −5 dB. However, for a fully loaded LTE network having a frequency reuse factor of N=1, test results show that the SINR at cell edges can be lower than −12 dB. Therefore, there is a need for a system and method for improving coverage in an LTE cellular communications network while maintaining high frequency reuse.

SUMMARY OF THE INVENTION

The present invention relates to boosting power for a communications link between a base station and a user device, or user equipment, over a communications link channel in a cellular communications network. In one embodiment, the communications link is a downlink. The base station determines whether a downlink for a user device located within a sector of a cell served by the base station needs a power boost. More specifically, the base station determines that the downlink needs a power boost if the user device is located in a cell edge area of the cell served by the base station. If a power boost is needed, the base station provides a power boost for the downlink to the user device and, for each of one or more neighboring sectors that neighbor the sector in which the user device is located, coordinates the power boost in both frequency and time with a power backoff for a downlink to another user device located in a cell center area of the neighboring sector. The one or more neighboring sectors may be all neighboring sectors in neighboring cells or a subset of all neighboring sectors in the neighboring cells. In addition, the one or more neighboring sectors may include one or more neighboring sectors in the cell in which the user device is located. By coordinating the power boost for the user device with the power backoffs for the downlinks to the other user devices located in the cell center areas of the one or more neighboring sectors, effects of increased out-of-cell interference resulting from the power boost are mitigated.

In another embodiment, the communications link is an uplink. The base station determines whether an uplink for a user device located within a sector of a cell served by the base station needs a power boost. More specifically, the base station determines that the uplink needs a power boost if the user device is located in a cell edge area of the cell served by the base station. If a power boost is needed, the base station provides a power boost for the uplink from the user device and, for each of one or more neighboring sectors that neighbor the sector in which the user device is located, coordinates the power boost in both frequency and time with a power backoff for an uplink to another user device located in an cell center area of the neighboring sector. The one or more neighboring sectors may be all neighboring sectors in neighboring cells or a subset of all neighboring sectors in the neighboring cells. In addition, the one or more neighboring sectors may include one or more neighboring sectors in the cell in which the user device is located. By coordinating the power boost for the user device with the power backoffs for the uplinks to the other user devices located in the cell center areas of the one or more neighboring sectors, effects of increased out-of-cell interference resulting from the power boost are mitigated.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 illustrates a cellular communications network in which base stations provide coordinated power boosts and power backoffs according to one embodiment of the present invention;

FIGS. 2A and 2B graphically illustrate a power boost according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
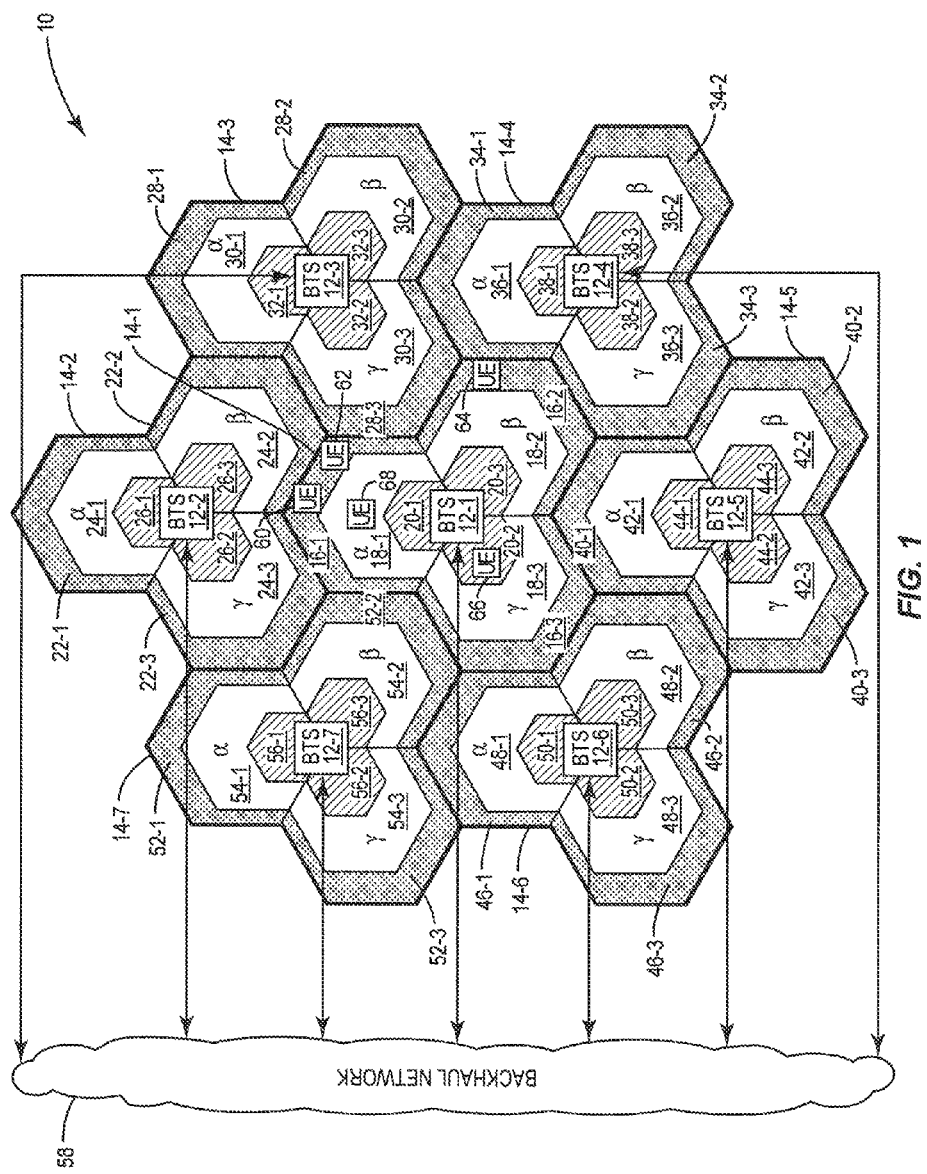

FIG. 1 illustrates a cellular communications network 10 according to one embodiment of the present invention. In the preferred embodiment, the cellular communications network 10 is a Long Term Evolution (LTE) cellular communications network. However, the present invention is not limited thereto. The present invention may be utilized in any cell-based or cellular communications network wherein power boosts are desired in order to increase coverage while maintaining high spectrum efficiency. In general, the cellular communications network 10 includes a number of base stations 12-1 through 12-7 forming corresponding cells 14-1 through 14-7 of the cellular communications network 10. The base stations 12-1 through 12-7 and the cells 14-1 through 14-7 may generally be referred to herein as base stations 12 and cells 14. Each of the cells 14 includes an alpha sector ($\alpha$), a beta sector ($\beta$), and a gamma sector ($\gamma$). Note that while only seven base stations 12-1 through 12-7 and corresponding cells 14-1 through 14-7 are shown for ease of discussion, it will be apparent to one of ordinary skill in the art that the cellular communications network 10 may include any number of base stations 12 and corresponding cells 14. Further, while in this embodiment each cell 14 includes three sectors, the present invention is not limited thereto. Each cell 14 may include any number of sectors.

Looking first at cell 14-1, the alpha sector of cell 14-1 includes a cell edge area 16-1, a cell middle area 18-1, and a cell center area 20-1. Likewise, the beta and gamma sectors of cell 14-1 include cell edge areas 16-2 and 16-3, cell middle areas 18-2 and 18-3, and cell center areas 20-2 and 20-3, respectively. The cell edge areas 16-1, 16-2, and 16-3 of the alpha, beta, and gamma sectors of the cell 14-1 are generally referred to herein as a cell edge area 16 of the cell 14-1. Likewise, the cell middle areas 18-1, 18-2, and 18-3 of the alpha, beta, and gamma sectors of the cell 14-1 are generally referred to herein as a cell middle area 18 of the cell 14-1, and the cell center areas 20-1, 20-2, and 20-3 of the alpha, beta, and gamma sectors of the cell 14-1 are generally referred to herein as a cell center area 20 of the cell 14-1.

In the preferred embodiment, the cell edge area 16 of the cell 14-1 is an area of the cell 14-1 in which Signal-to-Interference-plus-Noise Ratios (SINRs) for communications links (i.e., uplinks and/or downlinks) between user equipments (UEs) and the base station 12-1 are less than a minimum SINR ($SINR_{MIN}$). The minimum SINR ($SINR_{MIN}$) is preferably a minimum SINR needed to maintain an uplink and/or downlink connection with the base station 12-1. In an LTE cellular communications network, the minimum SINR ($SINR_{MIN}$) is approximately −5 decibels (dB). The cell center area 20 of the cell 14-1 is an area of the cell 14-1 in which SINRs for uplinks and/or downlinks between UEs and the base station 12-1 are greater than a maximum SINR ($SINR_{MAX}$). The maximum SINR ($SINR_{MAX}$) is preferably a SINR value at which throughput for the UEs is maximized. For an LTE cellular communications network, the maximum SINR ($SINR_{MAX}$) is approximately +19 dB for Single-Input-Single-Output (SISO) UEs. In an LTE cellular communications network, when the SINR is +19 dB, the modulation and coding scheme providing the maximum throughput is used, which is 64 Quadrature Amplitude Modulation (QAM) at a 3/4 coding rate. As such, improvements to the SINR beyond +19 dB provide no additional throughput. The cell middle area 18 of the cell 14-1 is an area of the cell 14-1 in which SINRs for uplinks and/or downlinks between UEs and the base station 12-1 is greater than the minimum SINR ($SINR_{MIN}$) and less than the maximum SINR ($SINR_{MAX}$).

The alpha, beta, and gamma sectors of the cell 14-2 include cell edge areas 22-1, 22-2, and 22-3, cell middle areas 24-1, 24-2, and 24-3, and cell center areas 26-1, 26-2, and 26-3. The cell edge areas 22-1, 22-2, and 22-3, the cell middle areas 24-1, 24-2, and 24-3, and the cell center areas 26-1, 26-2, and 26-3 are generally referred to herein as a cell edge area 22 of the cell 14-2, a cell middle area 24 of the cell 14-2, and a cell center area 26 of the cell 14-2, respectively. As discussed above with respect to the cell 14-1, the cell edge area 22 is an area of the cell 14-2 in which uplinks and/or downlinks to UEs have SINRs below the minimum SINR ($SINR_{MIN}$). The cell middle area 24 is an area of the cell 14-2 in which uplinks and/or downlinks to UEs have SINRs greater than the minimum SINR ($SINR_{MIN}$) and less than the maximum SINR ($SINR_{MAX}$), and the cell center area 26 is an area of the cell 14-2 in which uplinks and/or downlinks to UEs have SINRs greater than the maximum SINR ($SINR_{MAX}$).

The alpha, beta, and gamma sectors of the cell 14-3 include cell edge areas 28-1, 28-2, and 28-3, cell middle areas 30-1, 30-2, and 30-3, and cell center areas 32-1, 32-2, and 32-3. The cell edge areas 28-1, 28-2, and 28-3, the cell middle areas 30-1, 30-2, and 30-3, and the cell center areas 32-1, 32-2, and 32-3 are generally referred to herein as a cell edge area 28 of the cell 14-3, a cell middle area 30 of the cell 14-3, and a cell center area 32 of the cell 14-3, respectively. As discussed above with respect to the cell 14-1, the cell edge area 28 is an area of the cell 14-3 in which uplinks and/or downlinks to UEs have SINRs below the minimum SINR ($SINR_{MIN}$). The cell middle area 30 is an area of the cell 14-3 in which uplinks and/or downlinks to UEs have SINRs greater than the minimum SINR ($SINR_{MIN}$) and less than the maximum SINR ($SINR_{MAX}$), and the cell center area 32 is an area of the cell 14-3 in which uplinks and/or downlinks to UEs have SINRs greater than the maximum SINR ($SINR_{MAX}$).

The alpha, beta, and gamma sectors of the cell 14-4 include cell edge areas 34-1, 34-2, and 34-3, cell middle areas 36-1, 36-2, and 36-3, and cell center areas 38-1, 38-2, and 38-3. The cell edge areas 34-1, 34-2, and 34-3, the cell middle areas 36-1, 36-2, and 36-3, and the cell center areas 38-1, 38-2, and 38-3 are generally referred to herein as a cell edge area 34 of the cell 14-4, a cell middle area 36 of the cell 14-4, and a cell center area 38 of the cell 14-4, respectively. As discussed above with respect to the cell 14-1, the cell edge area 34 is an area of the cell 14-4 in which uplinks and/or downlinks to UEs have SINRs below the minimum SINR ($SINR_{MIN}$). The cell middle area 36 is an area of the cell 14-4 in which uplinks and/or downlinks to UEs have SINRs greater than the minimum SINR ($SINR_{MIN}$) and less than the maximum SINR ($SINR_{MAX}$), and the cell center area 38 is an area of the cell 14-4 in which uplinks and/or downlinks to UEs have SINRs greater than the maximum SINR ($SINR_{MAX}$).

The alpha, beta, and gamma sectors of the cell 14-5 include cell edge areas 40-1, 40-2, and 40-3, cell middle areas 42-1, 42-2, and 42-3, and cell center areas 44-1, 44-2, and 44-3. The cell edge areas 40-1, 40-2, and 40-3, the cell middle areas 42-1, 42-2, and 42-3, and the cell center areas 44-1, 44-2, and 44-3 are generally referred to herein as a cell edge area 40 of the cell 14-5, a cell middle area 42 of the cell 14-5, and a cell center area 44 of the cell 14-5, respectively. As discussed above with respect to the cell 14-1, the cell edge area 40 is an area of the cell 14-5 in which uplinks and/or downlinks to UEs have SINRs below the minimum SINR ($SINR_{MIN}$). The cell middle area 42 is an area of the cell 14-5 in which uplinks and/or downlinks to UEs have SINRs greater than the minimum SINR ($SINR_{MIN}$) and less than the maximum SINR ($SINR_{MAX}$), and the cell center area 44 is an area of the cell 14-5 in which uplinks and/or downlinks to UEs have SINRs greater than the maximum SINR ($SINR_{MAX}$).

The alpha, beta, and gamma sectors of the cell 14-6 include cell edge areas 46-1, 46-2, and 46-3, cell middle areas 48-1, 48-2, and 48-3, and cell center areas 50-1, 50-2, and 50-3. The cell edge areas 46-1, 46-2, and 46-3, the cell middle areas 48-1, 48-2, and 48-3, and the cell center areas 50-1, 50-2, and 50-3 are generally referred to herein as a cell edge area 46 of the cell 14-6, a cell middle area 48 of the cell 14-6, and a cell center area 50 of the cell 14-6, respectively. As discussed above with respect to the cell 14-1, the cell edge area 46 is an area of the cell 14-6 in which uplinks and/or downlinks to UEs have SINRs below the minimum SINR ($SINR_{MIN}$). The cell middle area 48 is an area of the cell 14-6 in which uplinks and/or downlinks to UEs have SINRs greater than the minimum SINR ($SINR_{MIN}$) and less than the maximum SINR ($SINR_{MAX}$), and the cell center area 50 is an area of the cell 14-6 in which uplinks and/or downlinks to UEs have SINRs greater than the maximum SINR ($SINR_{MAX}$).

The alpha, beta, and gamma sectors of the cell 14-7 include cell edge areas 52-1, 52-2, and 52-3, cell middle areas 54-1, 54-2, and 54-3, and cell center areas 56-1, 56-2, and 56-3. The cell edge areas 52-1, 52-2, and 52-3, the cell middle areas 54-1, 54-2, and 54-3, and the cell center areas 56-1, 56-2, and 56-3 are generally referred to herein as a cell edge area 52 of the cell 14-7, a cell middle area 54 of the cell 14-7, and a cell center area 56 of the cell 14-7, respectively. As discussed above with respect to the cell 14-1, the cell edge area 52 is an area of the cell 14-7 in which uplinks and/or downlinks to UEs have SINRs below the minimum SINR ($SINR_{MIN}$). The cell middle area 54 is an area of the cell 14-7 in which uplinks and/or downlinks to UEs have SINRs greater than the minimum SINR ($SINR_{MIN}$) and less than the maximum SINR ($SINR_{MAX}$), and the cell center area 56 is an area of the cell 14-7 in which uplinks and/or downlinks to UEs have SINRs greater than the maximum SINR ($SINR_{MAX}$).

In operation, the base stations 12-1 through 12-7 communicate via a backhaul network 58 to coordinate power boosts for communication links (i.e., uplinks and/or downlinks) for UEs in the respective cell edge areas of the sectors of their own cells with power backoffs for communication links for UEs in cell center areas of neighboring sectors in neighboring cells, thereby extending the coverage of the cellular communications network 10. The backhaul network 58 may be a wired network such as an Ethernet or fiber network, a wireless network, or a combination thereof. More specifically, in one embodiment, using the base station 12-1 as an example, the base station 12-1 monitors communication link SINRs for UEs located within the cell 14-1, which in this example include UEs 60, 62, 64, 66, and 68. UEs, such as the UE 68, having communication link SINRs greater than the minimum SINR ($SINR_{MIN}$) and less than the maximum SINR ($SINR_{MAX}$) are located in the cell middle area 18 of the cell 14-1. As such, the base station 12-1 does not provide a power boost or a power backoff for these UEs.

UEs having communication link SINRs less than the minimum SINR ($SINR_{MIN}$) are located within the cell edge area 16 of the cell 14-1. In this example, the UEs 60, 62, and 64 are located within the cell edge area 16 of the cell 14-1. In order to improve the communication link SINRs of the UEs 60, 62, and 64 to a point where communication links between the base station 12-1 and the UEs 60, 62, and 64 can be maintained, the base station 12-1 provides a power boost for the communication links for the UEs 60, 62, and 64. For each of the UEs 60, 62, and 64, the amount of power boost is related to a difference between the minimum SINR ($SINR_{MIN}$) and the communication link SINR for that UE.

UEs having communication link SINRs greater than the maximum SINR ($SINR_{MAX}$) are located within the cell center area 20 of the cell 14-1. In this example, the UE 66 is located in the cell center area 20 of the cell 14-1. Since the UE 66 has a communication link SINR beyond that which is needed for maximum throughput, the base station 12-1 provides a power backoff for the UE 66 such that the total effect of the power backoff and increased interference resulting from power boosts in neighboring sectors is a communication link SINR for the UE 66 of approximately the maximum SINR ($SINR_{MAX}$).

Further, in order to mitigate effects of additional interference resulting from the power boosts provided for communication links for UEs in the cell edge area 16 of the cell 14-1 as well as to avoid collisions of power boosted signals, the base station 12-1 coordinates the power boosts with power backoffs in neighboring sectors in both frequency and in time. Using the UE 60 as an example, in the preferred embodiment, the base station 12-1 coordinates the power boost for the communication link to the UE 60 located in the alpha sector of the cell 14-1 in both frequency and in time with a power backoff for a communication link to a UE in the respective cell center areas of each neighboring sector. Therefore, in this embodiment, the base station 12-1 coordinates the power boost for the communication link to the UE 60 with a power backoff for a communication link to a UE located in the cell center area 26-2 of the beta sector of the cell 14-2, a power backoff for a communication link to a UE located in the cell center area 26-3 of the gamma sector of the cell 14-2, a power backoff for a communication link to a UE in the cell center area 32-3 of the gamma sector of the cell 14-3, and a power backoff for a communication link to a UE in the cell center area 56-2 of the beta sector of the cell 14-7. In addition, the base station 12-1 may coordinate the power boost for the UE 60 in both frequency and in time with a power backoff for a communication link to a UE in the cell center area 20-2 of the beta sector of the cell 14-1 and a power backoff for a communication link to a UE, such as the UE 66, in the cell center area 20-3 of the gamma sector of the cell 14-1.

Figure 2A:
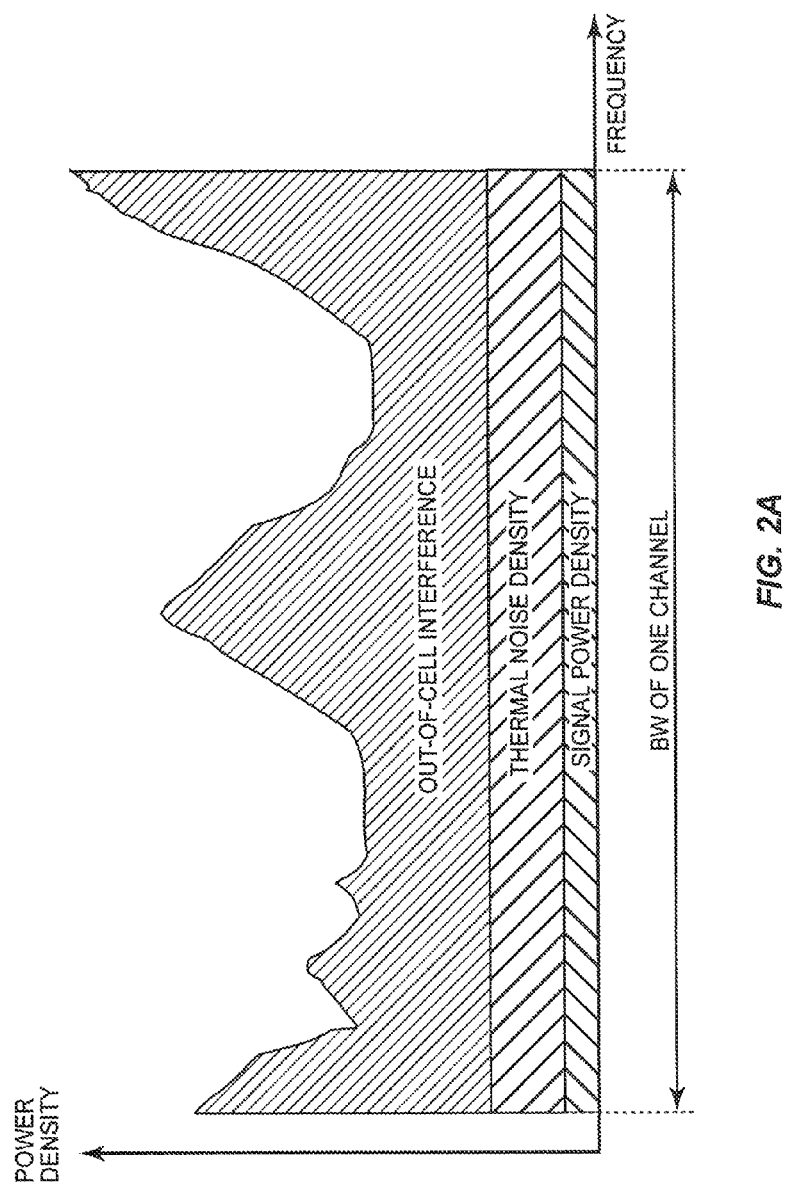
Figure 2B:
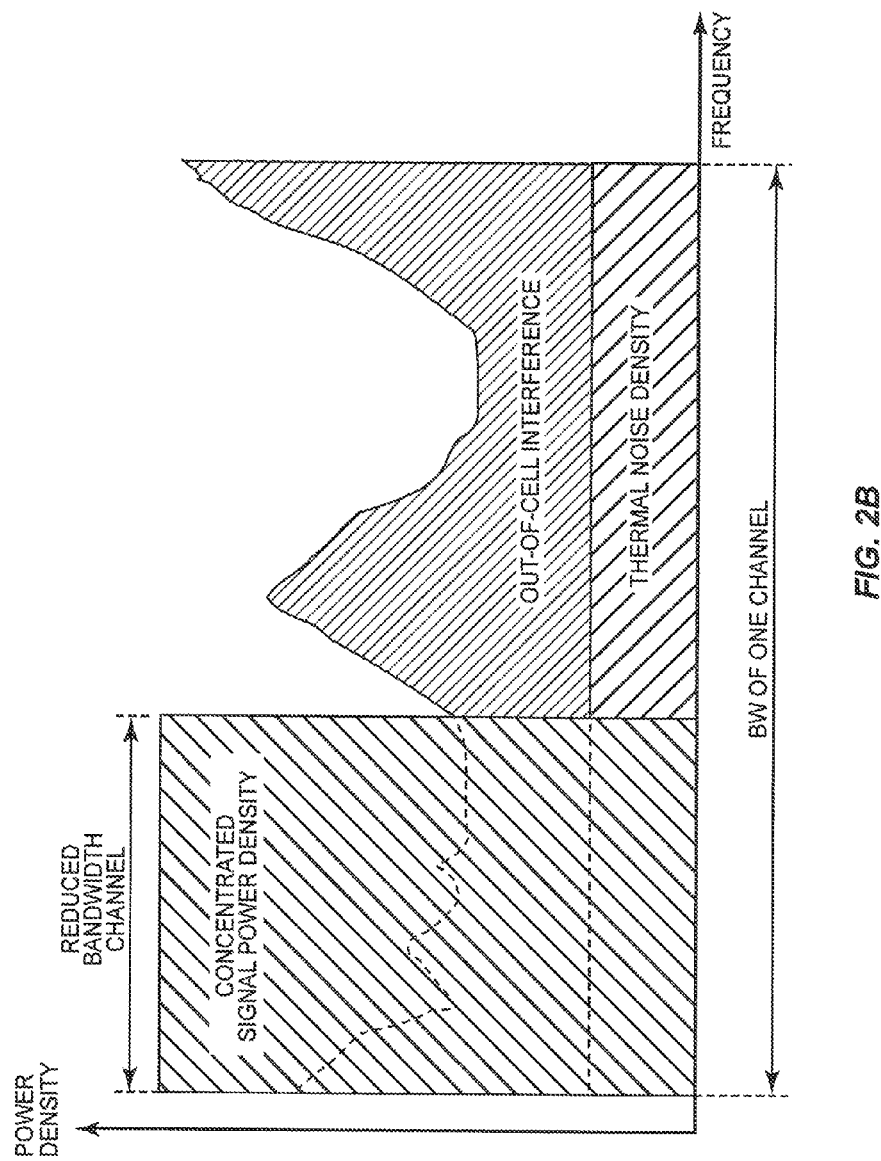

FIGS. 2A and 2B graphically illustrate a power boost according to one embodiment of the present invention. Before specifically discussing FIGS. 2A and 2B, a description of the downlink and uplink channels is needed. The downlink channel used by the base stations 12-1 through 12-7 has a full channel bandwidth including a number of sub-carrier frequencies over which data is transmitted. For LTE, the downlink channel is an Orthogonal Frequency Division Multiple Access (OFDMA) channel having a full channel bandwidth of 1.25 megahertz (MHz), 2.5 MHz, 5 MHz, 10 MHz, 15 MHz, or 20 MHz, depending on the particular implementation. Within the full channel bandwidth, data is modulated on a number of sub-carrier frequencies. In order to provide downlinks for the UEs located in the cell 14-1, resource blocks (RBs) within the downlink channel are allocated to the UEs as needed. A RB is formed by twelve consecutive sub-carrier frequencies in the frequency domain and fourteen consecutive symbols in the time domain, which corresponds to 180 kilohertz (KHz) in the frequency domain and one (1) millisecond (ms), or one (1) sub-frame, in the time domain. In a similar manner, the uplink channel used by the base stations 12-1 through 12-7 has a full channel bandwidth including a number of sub-carrier frequencies over which data is transmitted. For LTE, the uplink channel is a Single-Carrier Frequency Division Multiple Access (SC-FDMA) channel having a full channel bandwidth of 1.25 MHz, 2.5 MHz, 5 MHz, 10 MHz, 15 MHz, or 20 MHz, depending on the particular implementation. Within the full channel bandwidth, data is modulated on a number of sub-carrier frequencies. In order to provide uplinks for the UEs located in the cell 14-1, RBs within the uplink channel are allocated to the UEs as needed.

FIG. 2A illustrates a signal power density, thermal noise density, and out-of-cell interference in the full channel bandwidth of the downlink or the uplink channel without the power boost. As shown, the signal power density is spread across the full channel bandwidth. FIG. 2B illustrates the signal power density, thermal noise density, and out-of-cell interference after a power boost according to one embodiment of the present invention. Using the base station 12-1 and the UE 60 as an example, in order to provide a power boost for a downlink to the UE 60, the base station 12-1 provides a reduced bandwidth channel that is a sub-channel of the downlink channel. In other words, the reduced bandwidth channel is formed by a subset of the sub-carrier frequencies of the downlink channel. Further, the bandwidth of the reduced bandwidth channel is a portion of the full bandwidth of the downlink channel. The downlink to the UE 60 is provided by allocating one or more RBs in the reduced bandwidth channel for the downlink to the UE 60. By using the reduced bandwidth channel for the downlink to the UE 60 while keeping the signal power or transmit power constant, the signal power density is concentrated on the reduced channel bandwidth rather than spread across the full bandwidth of the downlink channel. The signal power density concentration provides a power boost for the downlink to the UE 60. In the same manner, a power boost may be provided for an uplink to the UE 60. Note that while FIG. 2B illustrates the reduced bandwidth channel as being a number of consecutive or contiguous sub-carrier frequencies, the present invention is not limited thereto. The sub-carrier frequencies forming the reduced bandwidth channel may be one or more contiguous sub-carrier frequencies, one or more non-contiguous sub-carrier frequencies, or a combination thereof.

By concentrating the signal power density, the SINR per sub-carrier frequency, or the SINR per tone, is substantially increased as compared to the SINR of the full bandwidth channel. Specifically, a SINR per-channel ($SINR_{CHANNEL}$) is defined as:

$$SINR_{CHANNEL} = \frac{P_{FULL\_CHANNEL\_BW}}{\text{Interference}_{FULL\_CHANNEL\_BW} + \text{Thermal\_Noise}_{FULL\_CHANNEL\_BW}},$$

where $P_{FULL\_CHANNEL\_BW}$ is the total signal power within the full channel bandwidth, $\text{Interference}_{FULL\_CHANNEL\_BW}$ is the total interference within the full channel bandwidth, and $\text{Thermal\_Noise}_{FULL\_CHANNEL\_BW}$ is the thermal noise power within the full channel bandwidth. The SINR per sub-carrier frequency, or SINR per tone, ($SINR_{TONE}$) is defined as:

$$SINR_{TONE} = \frac{P_{TONE\_BW}}{\text{Interference}_{TONE\_BW} + \text{Thermal\_Noise}_{TONE\_BW}},$$

where $P_{TONE\_BW}$ is the total signal power within the bandwidth of the tone, $\text{Interference}_{TONE\_BW}$ is the total interference within the bandwidth of the tone, and $\text{Thermal\_Noise}_{TONE\_BW}$ is the thermal noise power within the bandwidth of the tone. When the signal power is uniformly spread across the full bandwidth as shown in FIG. 2A, the SINR per-channel ($SINR_{CHANNEL}$) is equal to the SINR per tone ($SINR_{TONE}$). In contrast, when the signal power is concentrated on a reduced bandwidth channel as shown in FIG. 2B, the SINR per tone ($SINR_{TONE}$) is defined as:

$$SINR_{TONE} = SINR_{CHANNEL} + \text{Power\_Boost},$$

where Power_Boost is a gain [dB] resulting from the concentration of the signal power in the reduced bandwidth channel. In general, the power boost is related to a ratio of the full channel bandwidth and the reduced channel bandwidth of the reduced bandwidth channel. Specifically, the power boost may be defined as:

$$\text{Power\_Boost} = 10 \cdot \log_{10}\left(\frac{\text{full\_channel\_bandwidth}}{\text{reduced\_channel\_bandwidth}}\right)[dB].$$

Figure 3A:
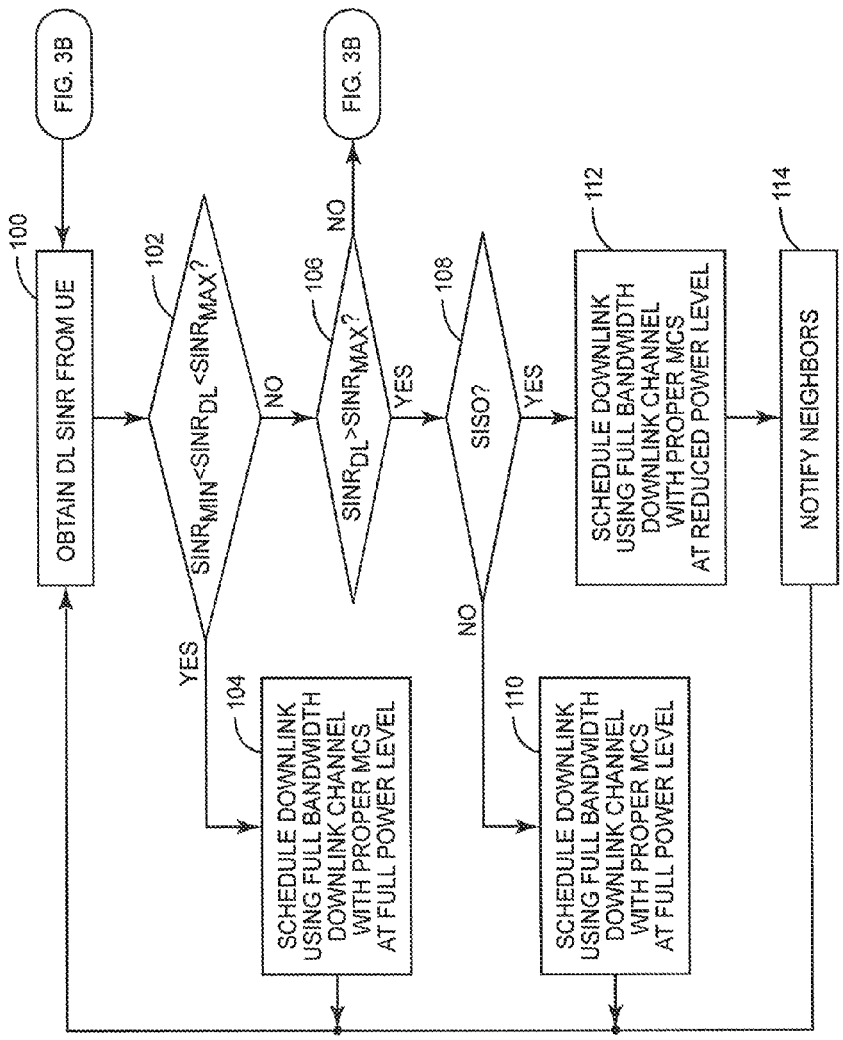
FIGS. 3A and 3B are a flow chart illustrating the operation of a base station implementing a coordinates power boost and power backoff scheme for a downlink according to one embodiment of the present invention.
Figure 3B:
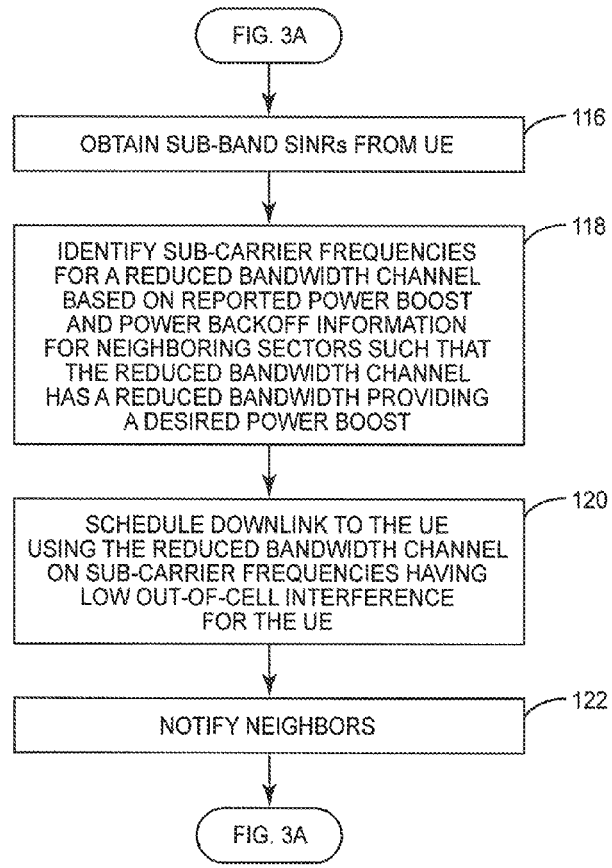

FIGS. 3A and 3B are a flow chart illustrating the operation of a base station implementing a coordinated power boost and power backoff scheme for a downlink according to one embodiment of the present invention. For this discussion, the base station is the base station 12-1 of FIG. 1. However, this discussion is equally applicable to the other base stations 12-2 through 12-7 in the cellular communications network 10. First, the base station 12-1 obtains a downlink SINR from a UE (step 100). In one embodiment, for an LTE cellular communications network, the base station 12-1 sends a request to the UE instructing the UE to report a Channel Quality Index (CQI) to the base station 12-1, where the CQI includes the downlink SINR for the UE. In response, the UE reports the CQI to the base station 12-1.

The base station 12-1 then determines whether the downlink SINR for the UE is greater than the minimum SINR ($SINR_{MIN}$) and less than the maximum SINR ($SINR_{MAX}$) (step 102). In other words, the base station 12-1 determines whether the UE is located in the cell middle area 18 of the cell 14-1. If so, the base station 12-1 schedules a downlink to the UE using the downlink channel having the full channel bandwidth using a proper Modulation and Coding Scheme (MCS)

at a full transmit power level (step 104). More specifically, for an LTE cellular communications network, the base station 12-1 selects the proper MCS for the UE based on the downlink SINR for the UE. Further, the full transmit power level may be a maximum transmit power of the base station 12-1 or a predetermined backoff from the maximum transmit power of the base station 12-1. The base station 12-1 schedules the downlink to the UE by allocating one or more sub-carrier frequencies during one or more transmit time intervals (TTIs) for the downlink to the UE. For an LTE cellular communications network, the base station 12-1 schedules the downlink to the UE by allocating one or more RBs for the downlink to the UE. The process then returns to step 100 and is repeated.

Returning to step 102, if the downlink SINR for the UE is not greater than the minimum SINR ($SINR_{MIN}$) and less than the maximum SINR ($SINR_{MAX}$) (i.e., if the UE is not located in the cell middle area 18 of the cell 14-1), the base station 12-1 determines whether the downlink SINR is greater than the maximum SINR ($SINR_{MAX}$) (step 106). In other words, the base station 12-1 determines whether the UE is located in the cell center area 20 of the cell 14-1. If so, in this embodiment, the base station 12-1 determines whether the UE is a SISO device (step 108). Note that, for an LTE cellular communications network, Multiple-Input-Multiple-Output (MIMO) devices may have improved throughput even as the downlink SINR increases above the maximum SINR ($SINR_{MAX}$), which for LTE is approximately +19 dB. If the UE is not a SISO device, the base station 12-1 schedules the downlink to the UE using the downlink channel having the full channel bandwidth using a proper MCS at the full transmit power level (step 110). The base station 12-1 schedules the downlink to the UE by allocating one or more sub-carrier frequencies during one or more TTIs for the downlink to the UE. For an LTE cellular communications network, the base station 12-1 schedules the downlink to the UE by allocating one or more RBs for the downlink to the UE. The process then returns to step 100 and is repeated.

Returning to step 108, if the UE is a SISO device, the base station 12-1 schedules the downlink to the UE using the downlink channel having the full channel bandwidth using a proper MCS at a reduced transmit power level, thereby providing a power backoff for the downlink to the UE (step 112). More specifically, the base station 12-1 schedules the downlink to the UE by allocating one or more sub-carrier frequencies during one or more TTIs for the downlink to the UE. For an LTE cellular communications network, the base station 12-1 schedules the downlink to the UE by allocating one or more RBs for the downlink to the UE. Further, in selecting the sub-carrier frequencies and TTI(s) or selecting RBs to allocate for the downlink to the UE, the base station 12-1 may consider information regarding power boosts and power backoffs in neighboring sectors of a sector within the cell 14-1 in which the UE is located that has been reported by the corresponding base stations via the backhaul network 58 (FIG. 1). For example, if the UE is located in the alpha sector of the cell 14-1, the base station 12-1 may consider information regarding power boosts and power backoffs reported from the neighboring sectors of the alpha sector of the cell 14-1, which are the beta and gamma sectors of the cell 14-2, the gamma sector of the cell 14-3, and the beta sector of the cell 14-7. The information regarding power boosts and power backoffs preferably includes information identifying the sub-carrier frequencies or RB sub-carrier frequency groups on which power boosts are currently being provided by the base stations 12-2, 12-3, and 12-7 in the neighboring sectors and the amount of power boost for each of those sub-carrier frequencies or RB sub-carrier frequency groups. In addition, the information regarding power boosts and power backoffs preferably includes information identifying the sub-carrier frequencies or RB sub-carrier frequency groups on which power backoffs are currently being provided by the base stations 12-2, 12-3, and 12-7 in the neighboring sectors and the amount of power backoff for each of those sub-carrier frequencies or RB sub-carrier frequency groups. In addition, the base station 12-1 may consider information regarding power boosts and power backoffs in the neighboring sectors within the cell 14-1.

Once the downlink is scheduled, the base station 12-1 notifies the other base stations 12-2 through 12-7 of the sub-carrier frequencies or the RB sub-carrier frequency groups scheduled for use for the downlink to the UE via the backhaul network 58 (step 114). For an LTE cellular communications network, the base station 12-1 notifies the other base stations 12-2 through 12-7 using X2 messages. Specifically, the base station 12-1 communicates a low interference state for the selected sub-carrier frequencies or the RB sub-carrier frequency groups scheduled for the downlink to the UE via a Relative Narrowband Transmit (Tx) Power (RNTP) indicator. At this point, the process returns to step 100 and is repeated.

Returning to step 106, if the downlink SINR for the UE is not greater than the maximum $SINR_{MAX}$, the UE is located in the cell edge area 16 of the cell 14-1. As such, a power boost is needed. In this embodiment, in order to provide the power boost, the base station 12-1 first obtains sub-band SINRs for each sub-band in the downlink channel from the UE (step 116). In one embodiment, for an LTE cellular communications network, the base station 12-1 sends a request to the UE for sub-band CQIs for the downlink channel. In response, the UE sends the sub-band CQIs, which include the sub-band SINRs, to the base station 12-1.

Next, the base station 12-1 identifies a subset of the sub-carrier frequencies of the downlink channel for a reduced bandwidth channel based on reported power boost and power backoff information for neighboring sectors such that the reduced bandwidth channel has a reduced bandwidth that is sufficient to provide a desired power boost (step 118). More specifically, in selecting the sub-carrier frequencies or RB sub-carrier frequency groups for the reduced bandwidth channel, the base station 12-1 considers information regarding power boosts and power backoffs in neighboring sectors of a sector in which the UE is located that has been reported by the corresponding base stations via the backhaul network 58 (FIG. 1). Thus, for example, if the UE is located in the alpha sector of the cell 14-1, the base station 12-1 considers information regarding power boosts and power backoffs reported from the neighboring sectors of the alpha sector of the cell 14-1, which are the beta and gamma sectors of the cell 14-2, the gamma sector of the cell 14-3, and the beta sector of the cell 14-7. The information regarding power boosts and power backoffs preferably includes information identifying the sub-carrier frequencies or RB sub-carrier frequency groups on which power boosts are currently being provided by the base stations 12-2, 12-3, and 12-7 in the neighboring sectors and the amount of power boost for each of those sub-carrier frequencies or RB sub-carrier frequency groups. In addition, the information regarding power boosts and power backoffs preferably includes information identifying the sub-carrier frequencies or RB sub-carrier frequency groups on which power backoffs are currently being provided by the base stations 12-2, 12-3, and 12-7 in the neighboring sectors and the amount of power backoff for each of those sub-carrier frequencies or RB sub-carrier frequency groups. In addition, the base station 12-1 may consider information regarding power boosts and power backoffs in the neighboring sectors within the cell 14-1.

Based on the information regarding power boosts and power backoffs in neighboring sectors, the base station 12-1 is enabled to select sub-carrier frequencies or RB sub-carrier frequency groups for the reduced bandwidth channel such that the power boost for the downlink to the UE is coordinated with power backoffs in neighboring sectors. Specifically, in one embodiment, the base station 12-1 selects sub-carrier frequencies or RB sub-carrier frequencies for the reduced bandwidth channel that, according to the power boost and power backoff information, are: (1) currently being used for a power backoff in each of the neighboring sectors and (2) are not currently being used by another neighboring sector for a power boost. Then, using at least a subset of the selected sub-carrier frequencies or RB sub-carrier frequencies, the base station 12-1 provides the reduced bandwidth channel having a reduced channel bandwidth that is sufficiently reduced as compared to the full channel bandwidth of the downlink channel to provide the desired power boost.

In the preferred embodiment, the power boost is coordinated with a power backoff in each neighboring sector in another cell and, optionally, each neighboring sector in the same cell. However, coordination of the power boost with a power backoff in each of the neighboring sectors may not be possible in either of two situations. The first situation is where one or more of the neighboring sectors do not have any UEs located in their cell center areas for which sub-carrier frequencies or RB sub-carrier frequencies are currently being used at a power backoff. The second situation is where one or more of the neighboring sectors do not have any more sub-carrier frequencies or RB sub-carrier frequency groups that are currently being used for a power backoff and are not already being used for a power boost in another neighboring sector. In either of these situations, rather than coordinating the power boost with a power backoff, the base station 12-1 may coordinate the power boost to avoid a collision with a power boosted signal from a neighboring sector. Specifically, based on the power boost and the power backoff information reported for the neighboring sectors, the base station 12-1 is enabled to determine which sub-carrier frequencies or which RB sub-carrier frequency groups are already being used for power boosts in neighboring sectors. The base station 12-1 may then select other sub-carrier frequencies or other RB sub-carrier frequency groups for the reduced bandwidth channel.

In one embodiment, the desired power boost is a difference between the minimum SINR ($SINR_{MIN}$) and the downlink SINR for the UE. This is particularly beneficial in a coverage limited situation, or noise limited situation, where the out-of-cell interference is much less than thermal noise (I<<n). In a coverage limited situation, the SINR improvement or gain for the UE resulting from an X dB power boost is X dB. In another embodiment, the desired power boost is $SINR_{MIN}$ minus the downlink SINR for the UE minus the amount of power backoff for the sub-carrier frequencies or the RB sub-carrier frequency groups with which the power boost is coordinated. This is particularly beneficial in an interference limited situation where the out-of-cell interference is much greater than the thermal noise (I>>n). In an interference limited situation, the SINR improvement or gain for the UE resulting from an X dB power boost coordinated with a Y dB power backoff is X+Y dB.

The bandwidth of the reduced bandwidth channel is indirectly related to the desired amount of power boost. In one embodiment, the reduced channel bandwidth may be determined based on the following equation:

$$\text{Power\_Boost} = 10 \cdot \log_{10}\left(\frac{\text{full\_channel\_bandwidth}}{\text{reduced\_channel\_bandwidth}}\right).$$

As such, $$\text{reduced\_channel\_bandwidth} = \frac{\text{full\_channel\_bandwidth}}{10^{\frac{\text{Power\_Boost}}{10}}}.$$

Thus, for example, if the desired power boost is 4.77 dB per sub-carrier, then the reduced channel bandwidth is ⅓ of the full channel bandwidth.

Next, the base station 12-1 schedules the downlink for the UE in the reduced bandwidth channel on sub-carrier frequencies or RB sub-carrier frequency groups that are currently experiencing low amount or a least amount of out-of-cell interference (step 120). More specifically, based on the sub-band SINRs obtained in step 116, the base station 12-1 may identify sub-carrier frequencies or RB sub-carrier frequency groups having sub-band SINRs that are greater than a threshold value and then select M of those sub-carrier frequencies or RB sub-carrier frequency groups, where M corresponds to a number of sub-carrier frequencies or RBs to be allocated for the downlink to the UE. In another embodiment, the base station 12-1 may select M sub-carrier frequencies or RB sub-carrier frequency groups having the highest sub-band SINRs, where again M corresponds to the number of sub-carrier frequencies or RB sub-carrier frequency groups to be allocated for the downlink to the UE. Then, the selected sub-carrier frequencies or RB sub-carrier frequency groups are allocated for the downlink to the UE during one or more TTIs.

The base station 12-1 notifies the other base stations 12-2 through 12-7 of the sub-carrier frequencies or RB sub-carrier frequency groups scheduled for use for the downlink to the UE via the backhaul network 58 (step 122). For an LTE cellular communications network, the base station 12-1 notifies the other base stations 12-2 through 12-7 using X2 messages. Specifically, the base station 12-1 communicates a high interference state for the selected sub-carrier frequencies or RB sub-carrier frequency groups scheduled for the downlink to the UE via the RNTP indicator. At this point, the process returns to step 100 and is repeated.

Note that in LTE, the shortest RNTP update period is 200 ms. As such, at most, the RNTP indicator can be updated every 200 ms. However, because the power boost and power backoff situations in the cells 14-1 through 14-7 will most likely change within this 200 ms period, the base station 12-1 may reuse sub-carrier frequencies used for a power boost for one or more additional power boosts during the 200 ms period. For example, if the base station 12-1 allocates a particular RB sub-carrier frequency group for a power boost for the downlink to the UE, the downlink to the UE may no longer be needed if the base station 12-1 has no more data to send to the UE. If this occurs within the 200 ms RNTP update period, the base station 12-1 may reuse the RB sub-carrier frequency group for another power boost of an equal or lesser amount. If no such power boost is needed, then the base station 12-1 will not schedule the RB sub-carrier frequency group until the next RNTP update is received. In a similar manner, sub-carrier frequencies used for a power backoff may be reused during the 200 ms RNTP update period for one or more additional power backoffs of equal or less amount.

Figure 4A:
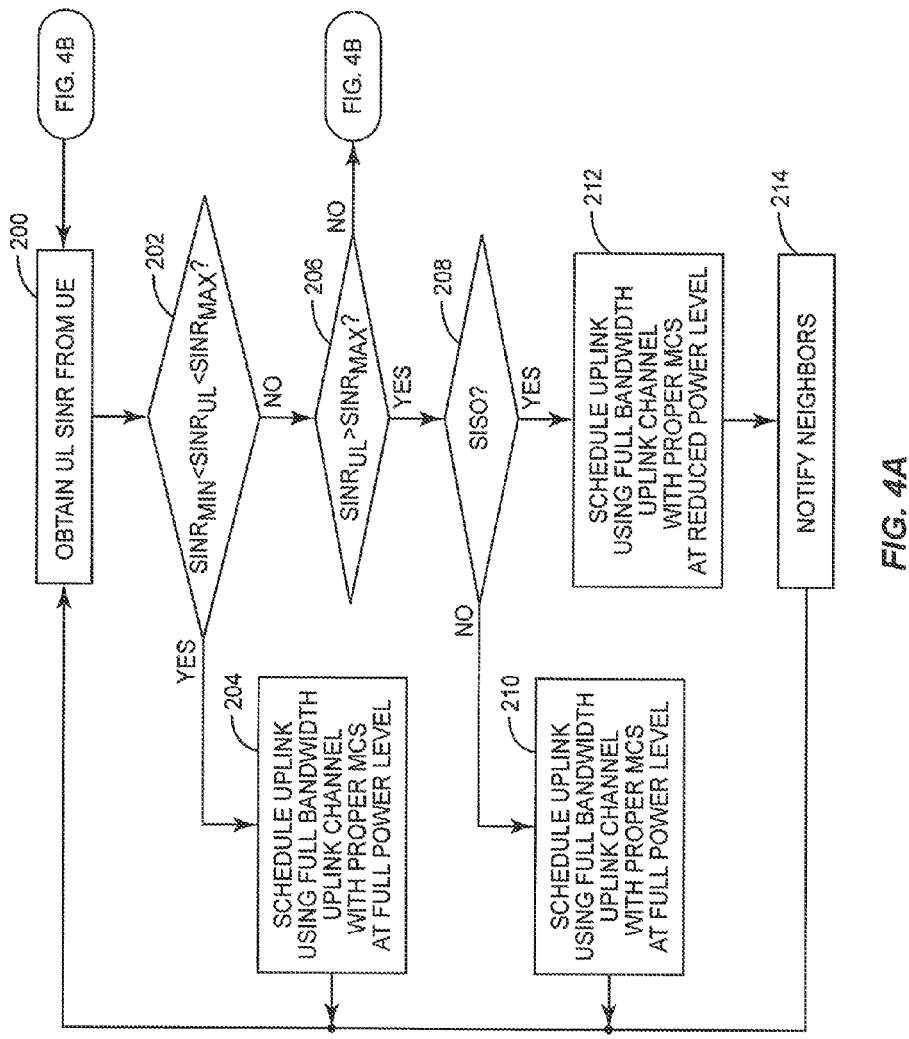
FIGS. 4A and 4B are a flow chart illustrating the operation of a base station implementing a coordinates power boost and power backoff scheme for an uplink according to one embodiment of the present invention.
Figure 4B:
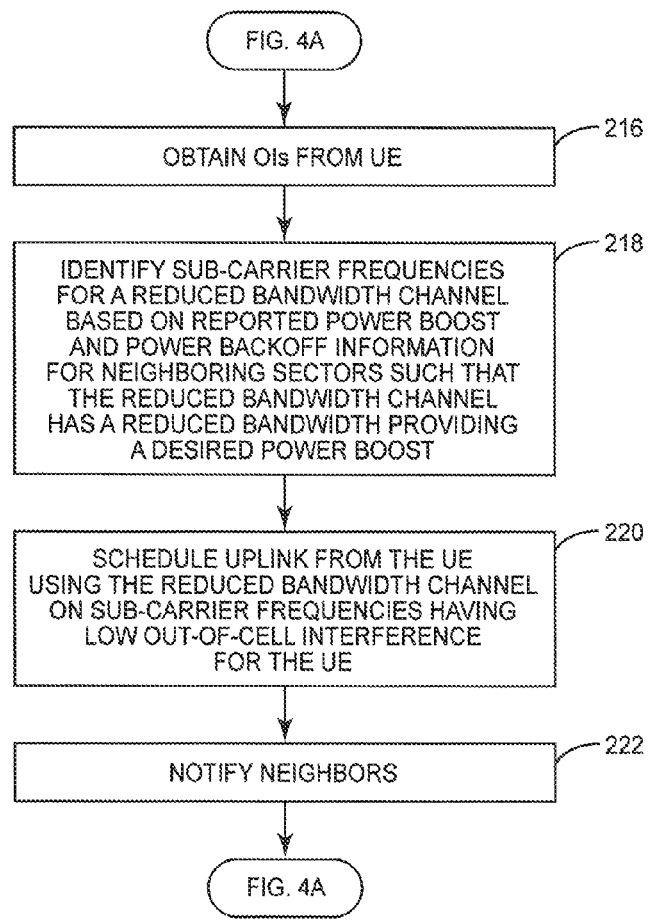

FIGS. 4A and 4B are a flow chart illustrating the operation of a base station implementing a coordinated power boost and power backoff scheme for an uplink according to one embodiment of the present invention. For this discussion, the base station is the base station 12-1 of FIG. 1. However, this discussion is equally applicable to the other base stations 12-2 through 12-7 in the cellular communications network 10. First, the base station 12-1 obtains an uplink SINR for a UE (step 200). In one embodiment, the base station 12-1 measures the uplink SINR for the UE. The base station 12-1 then determines whether the uplink SINR for the UE is greater than the minimum SINR ($SINR_{MIN}$) and less than the maximum SINR ($SINR_{MAX}$) (step 202). In other words, the base station 12-1 determines whether the UE is located in the cell middle area 18 of the cell 14-1. If so, the base station 12-1 schedules the uplink to the UE using an uplink channel having the full channel bandwidth using a proper MCS at a full transmit power level (step 204). More specifically, for an LTE cellular communications network, the base station 12-1 selects the proper MCS for the UE based on the uplink SINR for the UE. Further, the full transmit power level may be a maximum transmit power of the UE or a predetermined power backoff from the maximum transmit power of the UE. The base station 12-1 schedules the uplink from the UE by allocating one or more sub-carrier frequencies during one or more TTIs for the uplink to the UE. For an LTE cellular communications network, the base station 12-1 schedules the uplink from the UE by allocating one or more RBs for the uplink to the UE. The process then returns to step 200 and is repeated.

Returning to step 202, if the uplink SINR for the UE is not greater than the minimum SINR ($SINR_{MIN}$) and less than the maximum SINR ($SINR_{MAX}$) (i.e., if the UE is not located in the cell middle area 18 of the cell 14-1), the base station 12-1 determines whether the uplink SINR is greater than the maximum SINR ($SINR_{MAX}$) (step 206). In other words, the base station 12-1 determines whether the UE is located in the cell center area 20 of the cell 14-1. If so, in this embodiment, the base station 12-1 determines whether the UE is a SISO device (step 208). Note that, for an LTE cellular communications network, MIMO devices may have improved throughput even as the uplink SINR increases above the maximum SINR ($SINR_{MAX}$), which for LTE is approximately +19 dB. If the UE is not a SISO device, the base station 12-1 schedules the uplink to the UE using the uplink channel having the full channel bandwidth using a proper MCS at the full transmit power level (step 210). The base station 12-1 schedules the uplink to the UE by allocating one or more sub-carrier frequencies during one or more TTIs for the uplink to the UE. For an LTE cellular communications network, the base station 12-1 schedules the uplink to the UE by allocating one or more RBs for the uplink to the UE. The process then returns to step 200 and is repeated.

Returning to step 208, if the UE is a SISO device, the base station 12-1 schedules the uplink to the UE using the uplink channel having the full channel bandwidth using a proper MCS at a reduced transmit power level, thereby providing a power backoff for the uplink from the UE (step 212). More specifically, the base station 12-1 schedules the uplink to the UE by allocating one or more sub-carrier frequencies during one or more TTIs for the uplink to the UE. For an LTE cellular communications network, the base station 12-1 schedules the uplink to the UE by allocating one or more RBs for the uplink to the UE. Further, in selecting the sub-carrier frequencies and TTI(s) or selecting RBs to allocate for the uplink to the UE, the base station 12-1 may consider information regarding power boosts and power backoffs in neighboring sectors of a sector within the cell 14-1 in which the UE is located reported by the corresponding base stations via the backhaul network 58 (FIG. 1). For example, if the UE is located in the alpha sector of the cell 14-1, the base station 12-1 may consider information regarding power boosts and power backoffs reported from the neighboring sectors of the alpha sector of the cell 14-1, which are the beta and gamma sectors of the cell 14-2, the gamma sector of the cell 14-3, and the beta sector of the cell 14-7. The information regarding power boosts and power backoffs preferably includes information identifying the sub-carrier frequencies or RB sub-carrier frequency groups on which power boosts are currently being provided by the base stations 12-2, 12-3, and 12-7 in the neighboring sectors and the amount of power boost for each of those sub-carrier frequencies or RB sub-carrier frequency groups. In addition, the information regarding power boosts and power backoffs preferably includes information identifying the sub-carrier frequencies or RB sub-carrier frequency groups on which power backoffs are currently being provided by the base stations 12-2, 12-3, and 12-7 in the neighboring sectors and the amount of power backoff for each of those sub-carrier frequencies or RB sub-carrier frequency groups. In addition, the base station 12-1 may consider information regarding power boosts and power backoffs in the neighboring sectors within the cell 14-1.

Once the uplink is scheduled, the base station 12-1 notifies the other base stations 12-2 through 12-7 of the sub-carrier frequencies or RB sub-carrier frequency groups scheduled for use for the uplink to the UE via the backhaul network 58 (step 214). For an LTE cellular communications network, the base station 12-1 notifies the other base stations 12-2 through 12-7 using X2 messages. Specifically, the base station 12-1 communicates a low interference state for the selected sub-carrier frequencies or RB sub-carrier frequency groups scheduled for the uplink to the UE via via an LTE High-Interference Indicator (HII) or an LTE Overload Indicator (OI). At this point, the process returns to step 200 and is repeated.

Returning to step 206, if the uplink SINR for the UE is not greater than the maximum $SINR_{MAX}$, the UE is located in the cell edge area 16 of the cell 14-1. As such, a power boost is needed. In this embodiment, in order to provide the power boost, the base station 12-1 first determines an amount of out-of-cell interference for each sub-carrier frequency or RB sub-carrier frequency group in the uplink (step 216). In one embodiment, the base station 12-1 measures the out-of-cell interference per RB sub-carrier frequency group using the LTE OI.

Next, the base station 12-1 identifies a subset of the sub-carrier frequencies of the uplink channel for a reduced bandwidth channel based on reported power boost and power backoff information for neighboring sectors such that the reduced bandwidth channel has a reduced bandwidth that is sufficient to provide a desired power boost (step 218). More specifically, in selecting the sub-carrier frequencies or RB sub-carrier frequency groups for the reduced bandwidth channel, the base station 12-1 considers information regarding power boosts and power backoffs in neighboring sectors of a sector in which the UE is located that has been reported by the corresponding base stations via the backhaul network 58 (FIG. 1). Thus, for example, if the UE is located in the alpha sector of the cell 14-1, the base station 12-1 considers information regarding power boosts and power backoffs reported from the neighboring sectors of the alpha sector of the cell 14-1, which are the beta and gamma sectors of the cell 14-2, the gamma sector of the cell 14-3, and the beta sector of the cell 14-7. The information regarding power boosts and power backoffs preferably includes information identifying the sub-carrier frequencies or RB sub-carrier frequency groups on which power boosts are currently being provided by the base stations 12-2, 12-3, and 12-7 in the neighboring sectors and the amount of power boost for each of those sub-carrier frequencies or RB sub-carrier frequency groups. In addition, the information regarding power boosts and power backoffs preferably includes information identifying the sub-carrier frequencies or RB sub-carrier frequency groups on which power backoffs are currently being provided by the base stations 12-2, 12-3, and 12-7 in the neighboring sectors and the amount of power backoff for each of those sub-carrier frequencies or RB sub-carrier frequency groups. In addition, the base station 12-1 may consider information regarding power boosts and power backoffs in the neighboring sectors within the cell 14-1.

Based on the information regarding power boosts and power backoffs in neighboring sectors, the base station 12-1 is enabled to select sub-carrier frequencies or RB sub-carrier frequency groups for the reduced bandwidth channel such that the power boost for the uplink from the UE is coordinated with power backoffs in neighboring sectors. Specifically, in one embodiment, the base station 12-1 selects sub-carrier frequencies or RB sub-carrier frequencies for the reduced bandwidth channel that, according to the power boost and power backoff information, are: (1) currently being used for a power backoff in each of the neighboring sectors and (2) are not currently being used by another neighboring sector for a power boost. Then, using at least a subset of the selected sub-carrier frequencies or RB sub-carrier frequencies, the base station 12-1 provides the reduced bandwidth channel having a reduced channel bandwidth that is sufficiently reduced as compared to the full channel bandwidth of the uplink channel to provide the desired power boost.

In the preferred embodiment, the power boost is coordinated with a power backoff in each neighboring sector in another cell and, optionally, each neighboring sector in the same cell. However, coordination of the power boost with a power backoff in each of the neighboring sectors may not be possible in either of two situations. The first situation is where one or more of the neighboring sectors do not have any UEs located in their cell center areas for which sub-carrier frequencies or RB sub-carrier frequencies are currently being used for a power backoff. The second situation is where one or more of the neighboring sectors do not have any more sub-carrier frequencies or RB sub-carrier frequency groups that are currently being used for a power backoff and are not already being used for a power boost in another neighboring sector. In either of these situations, rather than coordinating the power boost with a power backoff, the base station 12-1 may coordinate the power boost to avoid a collision with a power boosted signal from a neighboring sector. Specifically, based on the power boost and power backoff information reported for the neighboring sectors, the base station 12-1 is enabled to determine which sub-carrier frequencies or which RB sub-carrier frequency groups are already being used for power boosts in neighboring sectors. The base station 12-1 may then select other sub-carrier frequencies or RB sub-carrier frequency groups for the reduced bandwidth channel.

In one embodiment, the desired power boost is a difference between the minimum SINR ($SINR_{MIN}$) and the uplink SINR for the UE. This is particularly beneficial in a coverage limited situation, or noise limited situation, where the out-of-cell interference is much less than thermal noise (I<<n). In a coverage limited situation, the SINR improvement or gain for the UE resulting from an X dB power boost is X dB. In another embodiment, the desired power boost is $SINR_{MIN}$ minus the uplink SINR for the UE minus the amount of power backoff for the sub-carrier frequencies or RB sub-carrier frequency groups with which the power boost is coordinated. This is particularly beneficial in an interference limited situation where the out-of-cell interference is much greater than the thermal noise (I>>n). In an interference limited situation, the SINR improvement or gain for the UE resulting from an X dB power boost coordinated with a Y dB power backoff is X+Y dB.

The bandwidth of the reduced bandwidth channel is indirectly related to the desired amount of power boost. In one embodiment, the reduced channel bandwidth may be determined based on the following equation:

$$\text{Power\_Boost} = 10 \cdot \log_{10}\left(\frac{\text{full\_channel\_bandwidth}}{\text{reduced\_channel\_bandwidth}}\right).$$

As such, $$\text{reduced\_channel\_bandwidth} = \frac{\text{full\_channel\_bandwidth}}{10^{\frac{\text{Power\_Boost}}{10}}}.$$

Thus, for example, if the desired power boost is 4.77 dB per sub-carrier, then the reduced channel bandwidth is ⅓ of the full channel bandwidth.

Next, the base station 12-1 schedules the uplink for the UE in the reduced bandwidth channel on sub-carrier frequencies or RB sub-carrier frequency groups that are currently experiencing a low amount, or a least amount, of out-of-cell interference (step 220). More specifically, based on the out-of-cell interference measured in step 216, the base station 12-1 may identify sub-carrier frequencies or RB sub-carrier frequency groups having out-of-cell interference that is less than a threshold value and then select M of those sub-carrier frequencies or RB sub-carrier frequency groups, where M corresponds to a number of sub-carrier frequencies or RBs to be allocated for the uplink to the UE. In another embodiment, the base station 12-1 may select M sub-carrier frequencies or RB sub-carrier frequency groups having the lowest out-of-cell interference, where again M corresponds to the number of sub-carrier frequencies or RB sub-carrier frequency groups to be allocated for the uplink to the UE. Then, the selected sub-carrier frequencies or RB sub-carrier frequency groups are allocated for the uplink to the UE during one or more TTIs.

The base station 12-1 notifies the other base stations 12-2 through 12-7 of the sub-carrier frequencies or RB sub-carrier frequency groups scheduled for use for the uplink to the UE via the backhaul network 58 (step 222). For an LTE cellular communications network, the base station 12-1 notifies the other base stations 12-2 through 12-7 using X2 messages. Specifically, the base station 12-1 communicates a high interference state for the selected sub-carrier frequencies or RB sub-carrier frequency groups scheduled for the downlink to the UE via the LTE HII or the LTE OI. At this point, the process returns to step 200 and is repeated.

Figure 5:
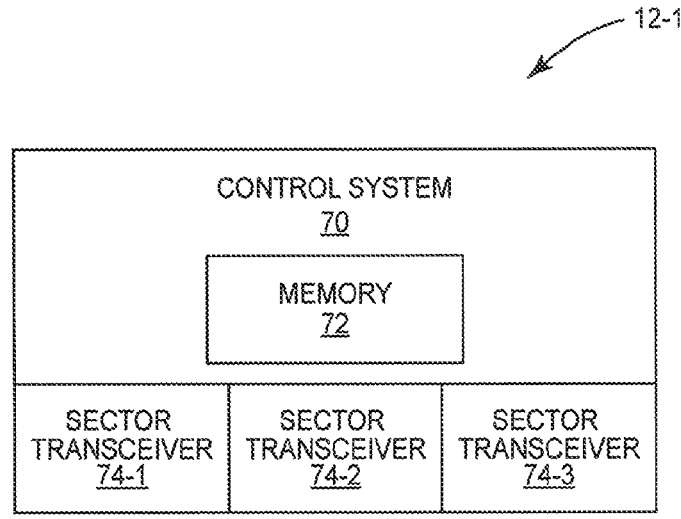
FIG. 5 is a block diagram of a base station according to one embodiment of the present invention.

FIG. 5 is a block diagram of an exemplary embodiment of the base station 12-1 of FIG. 1. However, this discussion is equally applicable to the other base stations 12-2 through 12-7 in the cellular communications network 10. In general, the base station 12-1 includes a control system 70 having associated memory 72. In addition, in this embodiment, the base station 12-1 includes sector transceivers 74-1, 74-2, and 74-3 for the alpha, beta, and gamma sectors of the cell 14-1 (FIG. 1), respectively. The functionality of the base station 12-1 discussed above for providing power boosts may be implemented in hardware forming part of the control system 70, software stored in the memory 72, or a combination thereof.

Figure 6:
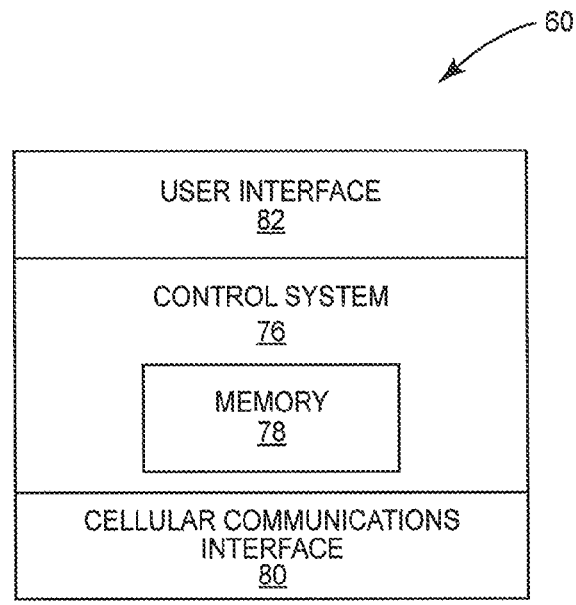
FIG. 6 is a block diagram of a user equipment (UE) according to one embodiment of the present invention.

FIG. 6 is a block diagram of the UE 60 of FIG. 1. This discussion is equally applicable to other UEs in the cellular communications network 10. In general, the UE 60 includes a control system 76 having associated memory 78. In addition, the UE 60 includes a cellular communications interface 80. The functionality of the UE 60 discussed above with respect to power boosting may be implemented within a protocol stack of the cellular communications interface 80 implemented in software stored in the memory 78, or a combination thereof. The UE 60 may also include a user interface 82, which may include components such as, for example, one or more user input devices (e.g., microphone, keypad, or the like), one or more speakers, a display, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operating a base station in a communications network, comprising:
   determining whether a power boost is deemed desirable for a first communications link between the base station and a first user device served by the base station in a first serving area of the base station; and
   when a power boost is deemed desirable for the first communications link between the base station and the user device, providing a power boost that is coordinated both in frequency and in time with a power back-off for a second communications link to a second user device served in a second serving area, the second serving area being a neighbor to the first serving area.

2. The method of claim 1, wherein the first serving area and the second serving area are neighboring cell sectors.

3. The method of claim 1, wherein a power boost is deemed desirable for the first communications link when a Signal-to-Interference-plus-Noise Ratio (SINR) for the first communications link is less than a first threshold SINR.

4. The method of claim 3, wherein the power back-off is applied to the second communications link when a SINR for the second communications link is greater than a second threshold SINR.

5. The method of claim 1 further comprising:
   when a power boost is deemed desirable for the first communications link, providing a power boost that is coordinated both in frequency and time with power back-offs for a plurality of other communications links, each of the plurality of other communication links being linked to a respective other device served in at least one other serving area of a plurality of other serving areas, each of the at least one other serving area being a neighbor to the first serving area.

6. The method of claim 5, wherein the power back-off is applied to a respective other communications link to another user device when a respective SINR for the respective other communications link is greater than a threshold SINR.

7. The method of claim 5, wherein:
   the first communications link has a full channel bandwidth comprising a plurality of sub-carrier frequencies; and
   providing a power boost for the first communications link comprises:
      identifying a subset of the plurality of sub-carrier frequencies of the first communications link as a reduced bandwidth channel for the first communications link based on information regarding power boosts and power back-offs in the plurality of other serving areas such that the reduced bandwidth channel has a reduced bandwidth that is less than the full channel bandwidth of the first communications link channel; and
      scheduling the first communications link using the reduced bandwidth channel such that signal power is concentrated on the subset of the plurality of sub-carrier frequencies in the reduced bandwidth channel.

8. The method of claim 7, wherein the information regarding power boosts and power back-offs in the plurality of other serving areas comprises information identifying sub-carrier frequencies from the plurality of sub-carrier frequencies of the communications links used for power boosts in the plurality of other serving areas, and information identifying sub-carrier frequencies from the plurality of sub-carrier frequencies of the communications links used for power back-offs in the plurality of other serving areas.

9. The method of claim 8, wherein the subset of the plurality of sub-carrier frequencies comprises sub-carrier frequencies from the plurality of sub-carrier frequencies that are being used for a power back-off in each of the plurality of other serving areas and are not being used for a power boost in any of the plurality of other serving areas.

10. The method of claim 7, further comprising determining an amount of out-of-serving-area interference for each of the subset of the plurality of sub-carrier frequencies, wherein:
    scheduling the first communications link using the reduced bandwidth channel comprises allocating at least one sub-carrier frequency from the subset of the plurality of sub-carrier frequencies in the reduced bandwidth channel having a least amount of out-of-serving-area interference.

11. The method of claim 10, further comprising notifying neighboring base stations of the scheduling of the first communications link.

12. The method of claim 7, further comprising notifying neighboring base stations of the scheduling of the first communications link.

13. A base station for a communications network, comprising:
    at least one transceiver operable to provide communications links to user devices located within a serving area of the base station; and
    a control system associated with the at least one transceiver operable to:
       determine whether a power boost is deemed desirable for a first communications link between the base station and a first user device served by the base station in a first serving area of the base station; and
       when a power boost is deemed desirable for the first communications link between the base station and the user device, provide a power boost that is coordinated both in frequency and in time with a power back-off for a second communications link to a second user device served in a second serving area, the second serving area being a neighbor to the first serving area.

14. The base station of claim 13, wherein the first serving area and the second serving area are neighboring cell sectors.

15. The base station of claim 13, wherein the control system is operable to deem desirable a power boost for the first communications link when a Signal-to-Interference-plus-Noise Ratio (SINR) for the first communications link is less than a first threshold SINR.

16. The base station of claim 15, wherein the control system is operable to apply the power back-off to the second communications link when a SINR for the second communications link is greater than a second threshold SINR.

17. The base station of claim 13, wherein when a power boost is deemed desirable for the first communications link, the control system is operable to provide a power boost that is coordinated both in frequency and time with power back-offs for a plurality of other communications links, each of the plurality of other communication links being linked to a respective other device served in at least one other serving area of a plurality of other serving areas, each of the at least one other serving area being a neighbor to the first serving area.

18. The base station of claim 17, wherein the control system is operable to apply the power back-oft to a respective other communications link to another user device when a respective SINR for the respective other communications link is greater than a threshold SINR.

19. The base station of claim 17, wherein:
the first communications link has a full channel bandwidth comprising a plurality of sub-carrier frequencies; and
the control system is operable to provide a power boost for the first communications link by:
identifying a subset of the plurality of sub-carrier frequencies of the first communications link as a reduced bandwidth channel for the first communications link based on information regarding power boosts and power back-offs in the plurality of other serving areas such that the reduced bandwidth channel has a reduced bandwidth that is less than the full channel bandwidth of the first communications link channel; and
scheduling the first communications link using the reduced bandwidth channel such that signal power is concentrated on the subset of the plurality of sub-carrier frequencies in the reduced bandwidth channel.

20. The base station of claim 19, wherein the information regarding power boosts and power back-offs in the plurality of other serving areas comprises information identifying sub-carrier frequencies from the plurality of sub-carrier frequencies of the communications links used for power boosts in the plurality of other serving areas, and information identifying sub-carrier frequencies from the plurality of sub-carrier frequencies of the communications links used for power back-offs in the plurality of other serving areas.

21. The base station of claim 20, wherein the subset of the plurality of sub-carrier frequencies comprises sub-carrier frequencies from the plurality of sub-carrier frequencies that are being used for a power back-oft in each of the plurality of other serving areas and are not being used for a power boost in any of the plurality of other serving areas.

22. The base station of claim 20, wherein the control system is further operable to notify neighboring base stations of the scheduling of the first communications link.

23. The base station of claim 19, wherein the control system is operable to:
determine an amount of out-of-serving-area interference for each of the subset of the plurality of sub-carrier frequencies; and
schedule the first communications link using the reduced bandwidth channel by allocating at least one sub-carrier frequency from the subset of the plurality of sub-carrier frequencies in the reduced bandwidth channel having a least amount of out-of-serving-area interference.

24. The base station of claim 19, wherein the control system is further operable to notify neighboring base stations of the scheduling of the first communications link.

25. A method of operating a base station in a communications network, comprising:
determining whether a power back-off is deemed desirable for a first communications link between the base station and a first user device served by the base station in a first serving area of the base station; and
when a power back-off is deemed desirable for the first communications link between the base station and the user device, scheduling the first communications with the power back-off and notifying a base station serving a second serving area of the scheduling of the first communications link.

26. The method of claim 25, wherein the first serving area and the second serving area are neighboring cell sectors.

27. The method of claim 25, wherein a power back-off is deemed desirable for the first communications link when a Signal-to-Interference-plus-Noise Ratio (SINR) for the first communications link is greater than a first threshold SINR.

28. The method of claim 27, wherein a power boost is applied to a second communications link when a SINR for the second communications link is less than a second threshold SINR.

29. The method of claim 25 further comprising:
when a power back-off is deemed desirable for the first communications link, scheduling the first communications with the power back-off and notifying a plurality of other base stations serving respective other serving areas of the scheduling of the first communications link, each of the respective other serving areas being a neighbor to the first serving area.

30. A base station for a communications network, comprising:
at least one transceiver operable to provide communications links to user devices located within a serving area of the base station; and
a control system associated with the at least one transceiver operable to:
determine whether a power back-off is deemed desirable for a first communications link between the base station and a first user device served by the base station in a first serving area of the base station; and
when a power back-off is deemed desirable for the first communications link between the base station and the user device, schedule the first communications with the power back-off and to notify a base station serving a second serving area of the scheduling of the first communications link.

31. The base station of claim 30, wherein the first serving area and the second serving area are neighboring cell sectors.

32. The base station of claim 30, wherein the control system is operable to deem desirable a power back-off for the first communications link when a Signal-to-Interference-plus-Noise Ratio (SINR) for the first communications link is greater than a first threshold SINR.

33. The base station of claim 32, wherein the control system is operable to apply a power boost to a second communications link when a SINR for the second communications link is less than a second threshold SINR.

34. The base station of claim 30, wherein when a power back-off is deemed desirable for the first communications link, the control system is operable to schedule the first communications with the power back-off and to notify a plurality of other base stations serving respective other serving areas of the scheduling of the first communications link, each of the respective other serving areas being a neighbor to the first serving area.

* * * * *

UNITED STATES PATENT AND TRADEMARK OFFICE
CERTIFICATE OF CORRECTION

PATENT NO. : 8,731,600 B2
APPLICATION NO. : 13/223907
DATED : May 20, 2014
INVENTOR(S) : Chu-Rui Chang and Jacques Fluet It is certified that error appears in the above-identified patent and that said Letters Patent is hereby corrected as shown below:

In the Claims

In Column 19, Line 16, In Claim 18, delete "back-oft" and insert -- back-off --, therefor.

In Column 19, Line 49, In Claim 21, delete "back-oft" and insert -- back-off --, therefor.

Signed and Sealed this
Twenty-seventh Day of January, 2015

Michelle K. Lee
*Deputy Director of the United States Patent and Trademark Office*